US005231427A

United States Patent [19]

Ohashi

[11] Patent Number: 5,231,427

[45] Date of Patent: Jul. 27, 1993

[54] IMAGE RECORDING APPARATUS

[75] Inventor: Tsuyoshi Ohashi, Hashima, Japan

[73] Assignee: Brother Kogyo Kabushiki Kaisha, Nagoya, Japan

[21] Appl. No.: 926,313

[22] Filed: Aug. 10, 1992

[30] Foreign Application Priority Data

Sep. 20, 1991 [JP] Japan .................................. 3-241154

[51] Int. Cl.$^5$ .............................................. G01D 15/06

[52] U.S. Cl. .................................... 346/155; 346/159; 101/DIG. 37; 358/401

[58] Field of Search ............ 346/160, 159, 155, 153.1; 355/214; 358/400, 401; 101/DIG. 37

[56] References Cited

U.S. PATENT DOCUMENTS

| | | | |
|---|---|---|---|
| 3,689,935 | 9/1972 | Pressman et al. | 346/74 ES |
| 3,942,980 | 3/1976 | Hou | 346/74 ES |
| 3,962,969 | 6/1976 | Watanabe et al. | 346/75 |
| 4,143,962 | 3/1979 | Kurtz . | |
| 4,435,066 | 3/1984 | Tarumi et al. | 358/300 X |
| 4,478,510 | 10/1984 | Fujii et al. . | |
| 4,491,855 | 1/1985 | Fujii et al. | 346/159 |
| 4,495,508 | 1/1985 | Tarumi et al. | 346/159 |
| 4,498,090 | 2/1985 | Honda et al. | 346/159 |
| 4,658,275 | 4/1987 | Fujii et al. | 346/154 |
| 4,814,796 | 3/1989 | Schmidlin | 346/155 |
| 4,860,036 | 8/1989 | Schmidlin | 346/159 |
| 4,862,289 | 8/1989 | Shimada | 346/108 X |
| 4,903,049 | 2/1990 | Sotack | 346/159 |
| 4,912,489 | 3/1990 | Schmidlin | 346/159 |
| 5,038,159 | 8/1991 | Schmidlin et al. | 346/159 |
| 5,068,961 | 12/1991 | Nishikawa | 29/825 |
| 5,095,322 | 3/1992 | Fletcher | 346/159 |
| 5,097,277 | 3/1992 | Schmidlin et al. | 346/155 |
| 5,124,802 | 6/1992 | Ito et al. | 346/160 X |

*Primary Examiner*—R. L. Moses
*Attorney, Agent, or Firm*—Oliff & Berridge

[57] ABSTRACT

Electrostatic image recording apparatus employing multi-apertured particle modulator is disclosed. The image recording apparatus receives digital electric image signals from an external device, such as a host computer, at a plurality of levels representative of the gradational values of the image to be formed. The image signals are distributed to a plurality of control electrodes which control the flow of toner particles to an image receiving member. The distributed digital image signals are converted to analog signals and a potential is applied to each control electrode based on the analog signal. The amount of toner particles passing through an aperture is controlled at a plurality of values by controlling the potential of a control electrode in a plurality of values based on image signals. As a result of the controls, a gradational dot can be formed. The resulting gradational image has high resolution.

16 Claims, 8 Drawing Sheets

IMAGE RECORDING APPARATUS

BACKGROUND OF THE INVENTION

1. Field of the Invention

The present invention relates to an image forming apparatus used for, for example, copiers or printers and particularly relates to an image recording apparatus in which an electric field attracts charged toner particles to form images.

2. Description of Related Art

As one of this kind of image recording apparatus, there has been proposed, for example, an image recording apparatus disclosed in U.S. Pat. No. 3,689,935. A particle modulator which has many small apertures is installed in the image forming apparatus. The passage through apertures of toner particles is controlled by applying drive signals to the particle modulator based on image signals. Toner particles which pass through the apertures adhere to a support member to form images.

The particle modulator of the image recording apparatus comprises a layer of insulating material, a reference electrode comprised of a layer of conducting material coated on one side of the layer of insulating material, a plurality of control electrodes formed on the other side of the layer of insulating material along its longitudinal direction. A plurality of control electrodes are insulatively isolated from each other. An aperture is formed in every control electrode.

At least a row of apertures is installed in the particle modulator so that the apertures extend through the three layers comprising the above-mentioned reference electrode, a layer of insulating material, and the control electrode.

The image recording apparatus comprises a device for supplying charged toner particles, a control electrode drive circuit for charging each of the control electrode and the reference electrode, and a device for positioning the support member, such as a recording paper, in the toner particle stream by relatively moving the support member on which an image is formed by toner particles which pass through the apertures of the particle modulator. Thus, the passage of toner particles through an aperture is enhanced and accelerated by the potential applied to each of the control electrode and the reference electrode.

In the above-mentioned image recording apparatus, toner particles pass through an aperture for a predetermined short time, and the toner particles adhere to the support member to form a dot. An image is formed by forming a plurality of dots on the support member, based on image signals.

However, in the above-mentioned image recording apparatus, the flow of toner particles through an aperture is controlled in two modes, in a first mode the passage of toner particles and the non-passage of toner particles is controlled, but not the amount of toner particles which pass through an aperture is not controlled. Since a gradational dot cannot be formed in this mode, the dither method is applied to form gradational images. However, the resolution of a gradational image formed in this manner is not sufficiently high for many printing requirements.

In the second mode, the above-mentioned image recording apparatus proposes use of an array of photoreceptors to control the density the flow of the toner particles through control apertures, thus forming dots of different density in accordance with a light image projected onto the array of photocells. While such a system may be useful in equipment such as photocopiers, where an optical image is readily available, such a system is not readily adaptable to printers or other imaging devices which are supplied with image information in digital, electronic form from an external device, such as a host computer.

SUMMARY OF THE INVENTION

An object of the present invention is to provide an image recording apparatus for forming a gradational image of high resolution.

In order to attain the above objects, an image recording apparatus of the present invention comprises a particle modulator formed with a plurality of control electrodes insulated from each other, having an aperture which penetrates the control electrode, and a toner supply means for supplying charged toner particles to the particle modulator. The image recording apparatus includes an image signal receiving means for receiving digital electrical signals from an external device, which signals represent a plurality of levels of potential to be applied to the plurality of control electrodes. A converting means is provided for converting the digital electrical signals received by the image receiving means to analog signals. A potential applying means applies potentials to each of the control electrodes in accordance with the analog signals converted by the converting means, so that potentials corresponding to the levels represented by the digital electric signals are applied to the control electrodes.

The charged toner particles supplied adjacent the aperture by the toner supplying means pass through the aperture according to the potential applied to each of the control electrodes of the particle modulator by the potential applying means. The charged toner particles adhere to a support member, such as a recording paper, which is moved relative to the apertures of the particle modulator by a moving means.

When the charged toner particles are being applied to the support member, the potential applying means applies potentials controlled in a plurality of levels to each of the control electrodes of the particle modulator based on image signals. Therefore, an electric field having a strength corresponding to the image signal is formed in each aperture. The passage speed of the charged toner particle stream changes according to the electric field strength and the amount of toner particles of each dot changes to form a dot of the density corresponding to an image signal. Therefore, images can be formed with gradation and high resolution.

As explained in detail above, since the potential of control electrodes which control the passage of toner particles through an aperture is controlled in a plurality of levels based on an image signal, a gradational image dot can be formed without decreasing its resolution. The system disclosed can be incorporated into a standalone imagers and printers that do not include optical imaging capabilities.

BRIEF DESCRIPTION OF THE DRAWINGS

A preferred embodiment of the present invention will be described in detail with reference to the following drawings wherein.

DETAILED DESCRIPTION OF THE PREFERRED EMBODIMENT

Referring now to accompanying drawings, a preferred embodiment of the present invention will be described in detail.

Figure 1:
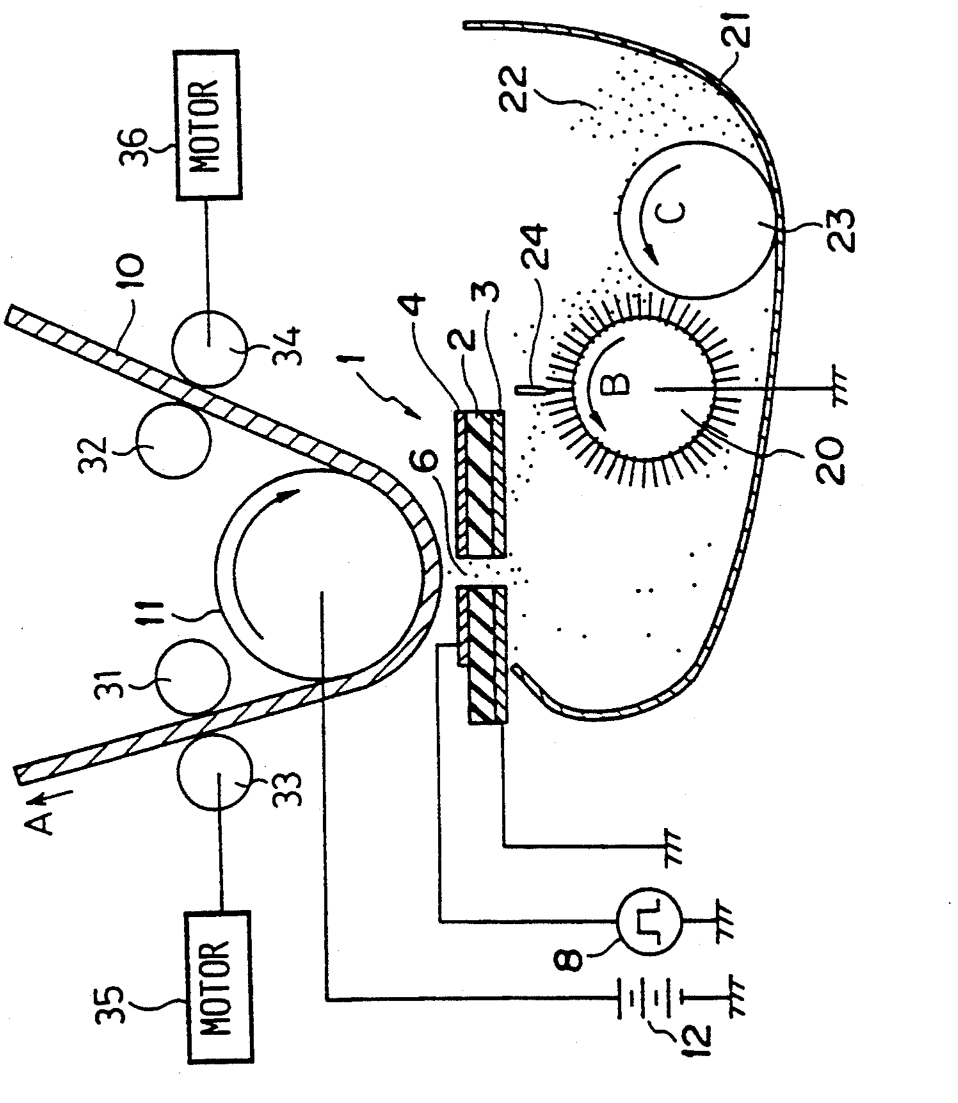
FIG. 1 briefly shows a sectional view of an image forming apparatus which embodies the present invention.

A particle modulator 1 is installed in an image forming apparatus of this embodiment as shown in FIG. 1. A layer of insulating material 2, a reference electrode 3 formed on the lower side of the layer of insulating material 2, and a plurality of control electrodes 4 formed on the upper side of the layer of insulating material 2 comprise the particle modulator 1.

In addition, a brush roller 20, a supply roller 23 and a back electrode 11 are installed in the image forming apparatus. The brush roller 20 and the supply roller 23 are disposed on the near side of the reference electrode 3 of the particle modulator 11. The back electrode 11 is installed rotatably above the control electrode 4 of the particle modulator 1.

A support member 10 which is, for example, plain paper, is supported by a pair of feeding rollers 31 and 33 and another pair of feeding rollers 32 and 34. The support member 10 is passed between the particle modulator 1 and the back electrode 4 confronting with the particle modulator 1.

If the feeding roller 33 is rotated by a motor 35 and the feeding roller 34 is rotated by a motor 36, the support member 10 is transported in the direction indicated by the arrow A touching the back electrode 11, and the support member 10 moves above the particle modulator 1. The direction of the movement of the support member 10 is perpendicular to the longitudinal direction of the particle modulator 1.

Figure 2:
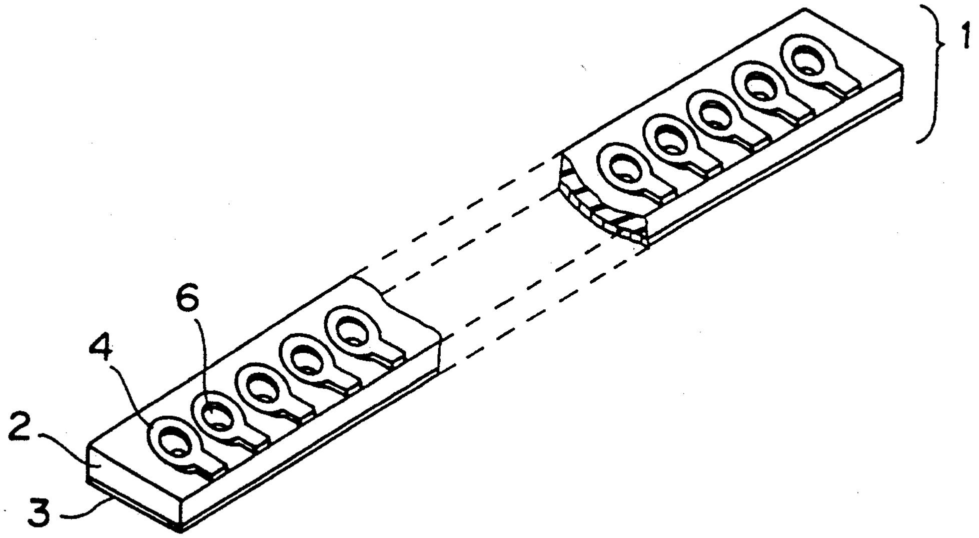
FIG. 2 is a perspective view showing a particle modulator in detail.

The reference electrode 3 of the particle modulator 1 is formed by a layer of conducting material covering over the whole area of the lower side of the layer of insulating material 2 as shown in detail in FIG. 2. The layer of insulating material 2 is as long as the width of the support member 10.

A plurality of control electrodes 4 of the particle modulator 1 are formed in a row along its longitudinal direction. The plurality of control electrodes 4 are insulatively isolated each other. The part where a control electrode 4 is formed has a three layer structure which consists of a reference electrode 3, a layer of insulating material 2, and a control electrode 4. An aperture 6 is formed at almost the center of each control electrode 4 so that the aperture 6 runs through the three layer structure. Each control electrode 4 is connected to a control voltage drive circuit 8 which generates voltage determined by image signals.

Figure 3:
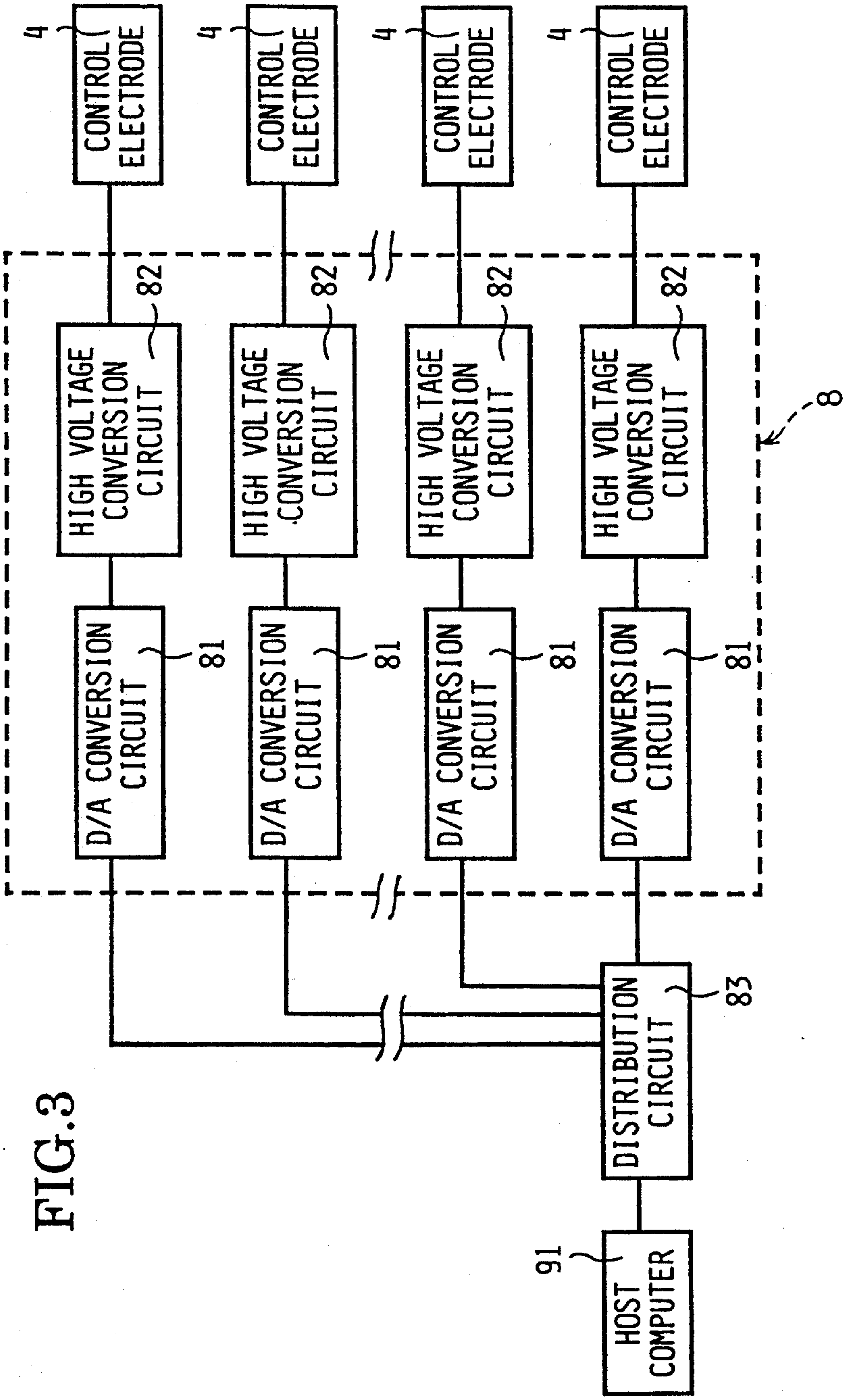
FIG. 3 shows an electric structure of an image forming apparatus.

As shown in FIG. 3, the control voltage drive circuit 8 is connected to a distribution circuit 83. A host digital computer 91 of an external device is connected to the distribution circuit 83. The host computer 91 sends image signals of 8 bit digital signals such as for example from 00h to FFh (hexadecimal) to the distribution circuit 83 serially.

The distribution circuit 83 distributes the digital electric image signal serially received from the host computer 91 to a control voltage drive circuit 8. The drive circuit 8 has an input corresponding to each of the control electrodes 4. The distribution circuit 83 can comprise a scanner that synchronously supplies the serial signals sequentially to each input of the drive circuit 8. Or, each image signal, for example the 8 bit digital signal mentioned above, can be accompanied by location information utilized by the distribution circuit 83 to apply the image signal to the appropriate inputs of the drive circuit 8. In this manner, each 8 bit image signal is supplied for controlling the potential applied to the corresponding control electrode 4. Distribution circuits of the types described above are known and no further detailed description thereof is necessary.

The control voltage drive circuit 8 comprises D/A conversion circuits 81 and high voltage conversion circuits 82. The D/A conversion circuits 81 convert the digital electric image signals to analog voltages. The high voltage conversion circuits 82 convert the analog voltages to the high voltage potentials to apply to the control electrodes 4.

Figure 5:
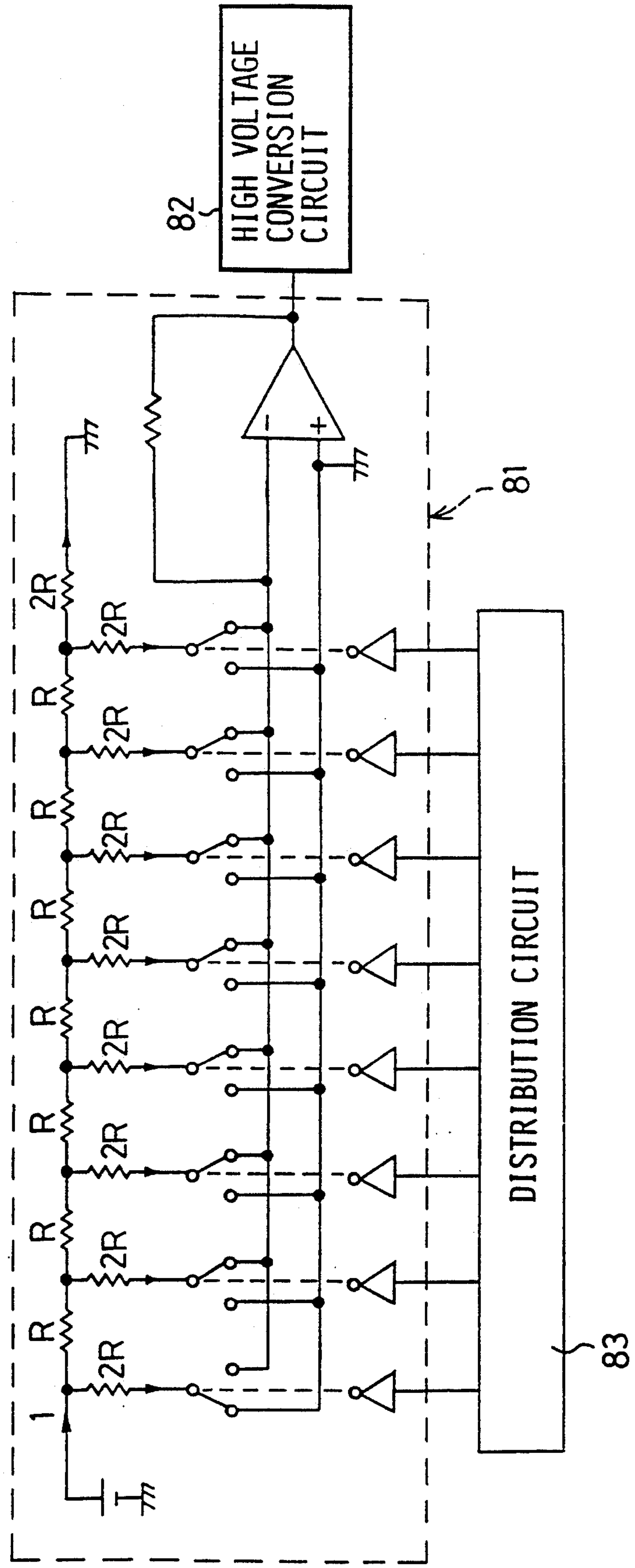
FIG. 5 shows a structure of a D/A conversion circuit.
Figure 6:
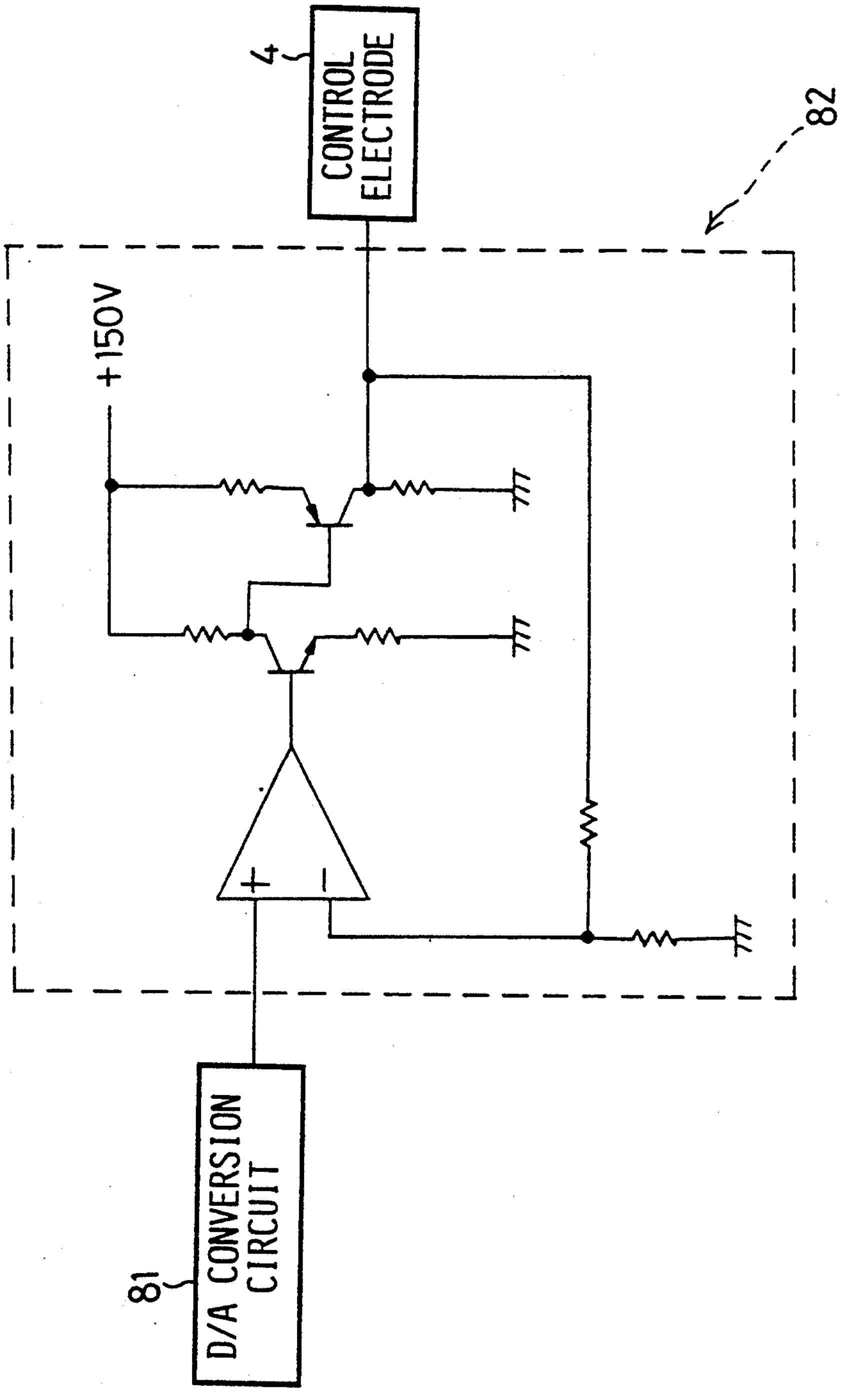
FIG. 6 shows a structure of a high voltage conversion circuit.

The distribution circuit 83 distributes image signals sent from the host computer 91 to the D/A conversion circuits 81. The number of the D/A conversion circuits 81 and high voltage conversion circuits 82 corresponds to the number of control electrodes 4, there being one D/A conversion circuit and one high voltage conversion circuit associated with each control electrode 4. Although for purposes of convenience only a few control electrodes and associated D/A conversion and high voltage circuits are shown, typically the particle modulator 1 will have several hundred apertures for each unit of length to achieve desired resolutions of, for example, 300–600 dots per inch. The structure of the D/A conversion circuit 81 is shown in FIG. 5 and the structure of the high voltage conversion circuit 82 is shown in FIG. 6. Such circuits are known and no further detailed description thereof is necessary.

Figure 4:
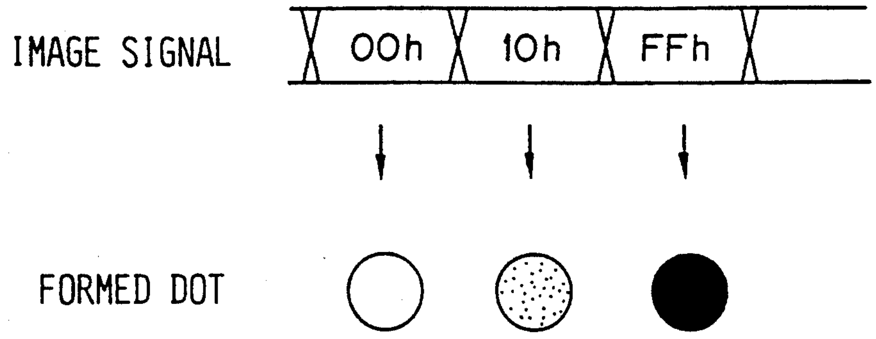
FIG. 4 shows gradational toner particle dots formed corresponding to image signals.

As shown in FIG. 4, the control voltage drive circuit 8 outputs 0 V and 100 V corresponding to 00h and FFh respectively, and thus the control voltage drive circuit 8 outputs and analog voltage potential corresponding to digital image signals between 00h and FFh.

The back electrode 11 attracts toner particles which pass through apertures 6 of the particle modulator 1 in the direction of the support member 10. The back electrode 11 is connected to high voltage power supply 12 and for example, a positive polarity of 1 kV is applied to the back electrode 11.

The brush roller 20 and the supply roller 23 are disposed in a toner particle casing 21 where toner particles 22 are stored. The brush of the brush roller 20 and the supply roller 23 contact with each other. A brush scratch blade 24 is disposed on the surface of the brush roller 20 at a position adjacent the aperture 6 of the particle modulator 1. The brush scratch blade 24 contacts with the bristles of brush roller 20.

Next, the operation of the image recording apparatus of the above-mentioned structure is explained.

When the brush roller 20 and the supply roller 23 rotate in directions indicated by the arrows B and C respectively, toner particles 22 in the toner particle casing 21 are triboelectrically charged, for example, in a negative polarity by the friction with the brush of the brush roller 20 and become charged. The charged toner particles are carried by the bristles of the brush roller 20.

The charged toner particles supported on the brush are transported in the direction of the brush scratch blade 24 corresponding to the rotation of the brush roller 20. Afterwards, the bristles contact with the brush scratch blade 24. When the charged toner particles 22 supported on the brush are subjected to the action of the brush scratch blade 24, the charged toner particles 22 are separated from the brush by the elastic power of the bristles. The charged toner particles 22 are supplied to the lower side of the aperture 6 of the reference electrode 3 in the form of a mist.

The voltage corresponding to an image signal is applied to a control electrode 4 by the control voltage drive circuit 8. If the image signal is not 00h, the control electrode 4 corresponding to the image signal is charged in a positive polarity by the control voltage drive circuit 8. In the control electrode 4 charged in a positive polarity, an electric field is formed inside and on the lower side of the aperture. In the electric field, the force lines are directed toward the control electrode 4 side from the reference electrode 3 side.

The toner particles 22 charged in a negative polarity pass through the aperture 6 and they are attracted to the upper side (control electrode 4 side) of the particle modulator 1 from the lower side (reference electrode 3 side) of the particle modulator by the electric field. The charged toner particles 22 passing through the aperture 6 are drawn out to the upper side of the particle modulator 1 and are attracted to the support member 10 by the back electrode 11 to which a positive polarity of 1 kV is applied. The charged toner particles 22 attracted to the support member 10 adhere to the support member 10 to form a toner particle dot.

The voltage supplied to the control electrodes 4 by the control voltage drive circuit 8 is stepped, for example, in 256 levels between 0 V and 100 V based on the image signals. The electric field strength in apertures 6 changes corresponding to the change of the voltage to be supplied to the control electrodes 4. The speed of the stream of toner particles which passes through the aperture 6 in a predetermined time also changes according to the change of the voltage. Since the amount of toner particles passing through an aperture 6 changes and the amount of toner particles of each dot also changes, the density of each dot can be changed, for example, in 256 levels. The density of each dot is controlled by image signals as shown in FIG. 4.

On the other hand, when an image signal is 00h, 0 V is applied to a control electrode 4, since the same potential of the reference electrode 3, that is, ground potential, is applied to the control electrode 4, the electric field formed by the back electrode 11 is shielded. Therefore, the passage of toner particles through the aperture is restrained and a toner particle dot is not formed on the support member 10.

Toner particle images are formed on the support member 10 by repeating the above-mentioned process for each pixel position of the support member 10.

It is to be understood that the present invention is not restricted to the particular forms shown in the foregoing embodiment. Various modifications and alterations can be made thereto without departing from the scope of the inventions encompassed by the appended claims.

Figure 7:
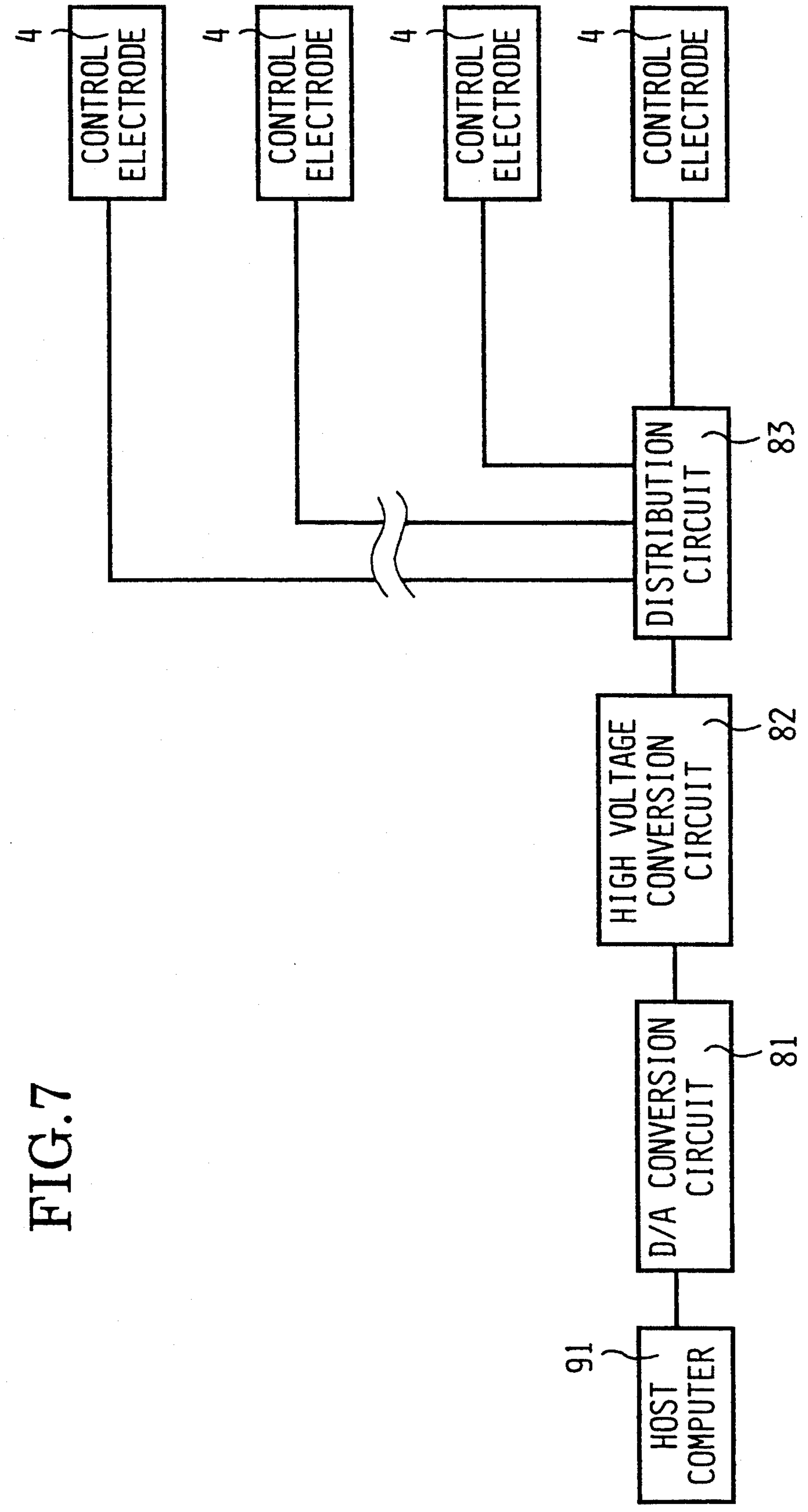
FIG. 7 shows an electric structure of a second embodiment of an image forming apparatus.

In the second embodiment shown in FIG. 7, the distribution circuit 83 is disposed between the high voltage conversion circuit 82 and the control electrodes 4. The distribution circuit distributes the plurality of levels of potentials from the high voltage conversion circuit and distributes them to the control electrodes so that the appropriate potential is applied to each control electrode to form the image based on the signals from the host computer 91. An advantage of this embodiment is that only a single D/A conversion circuit 81 and high voltage conversion circuit 82 is needed.

Figure 8:
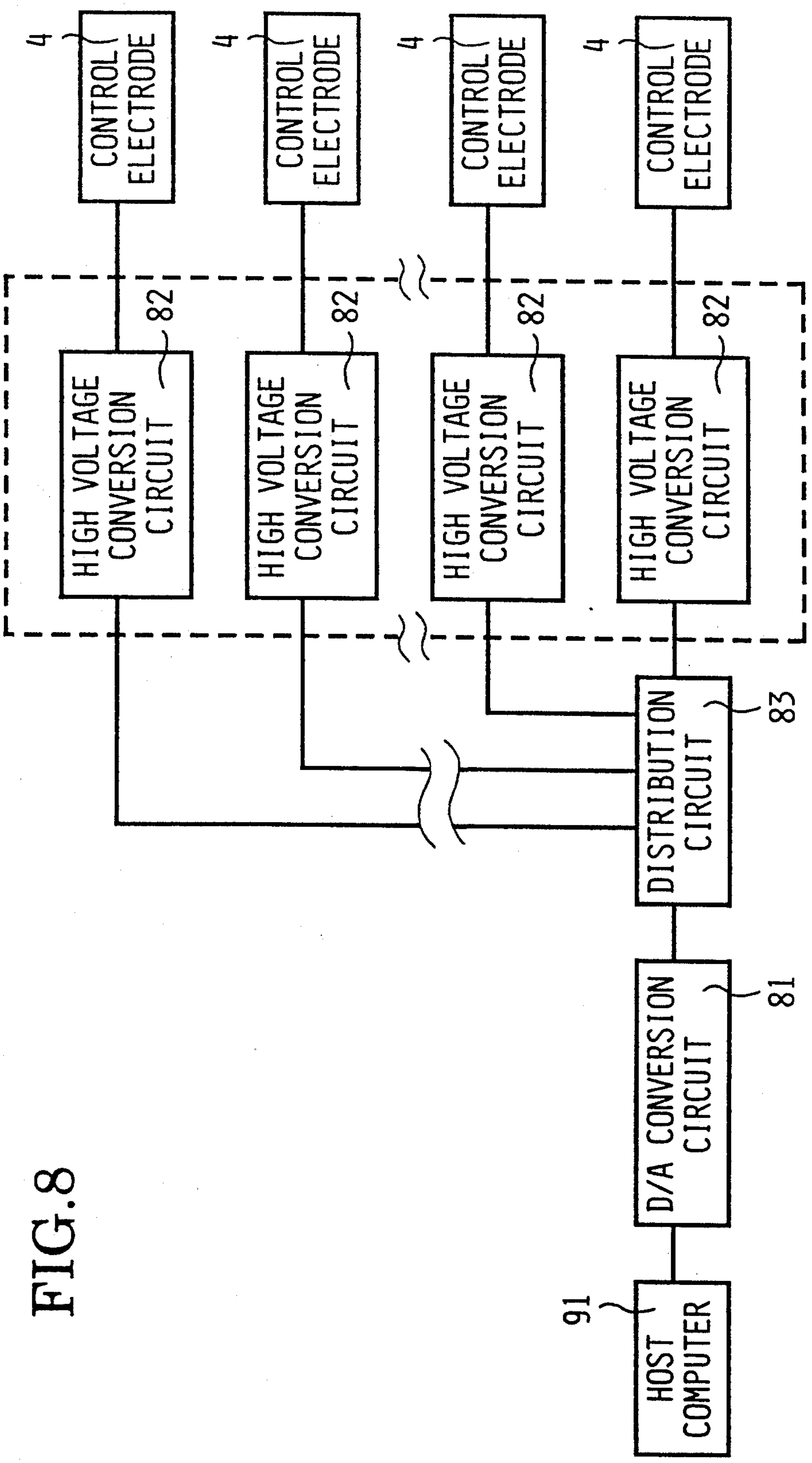
FIG. 8 shows an electric structure of a third embodiment of an image forming apparatus.

In the third embodiment shown in FIG. 8, the distribution circuit 83 is disposed between the D/A conversion circuit 81 and a plurality of high voltage conversion circuits 82, there being one high voltage conversion circuit 82 for each control electrode 4. The distribution circuit distributes the relatively low level analog signals from the D/A conversion circuit 81 and supplies those signals in the appropriate sequence to the high voltage conversion circuits 82 to form the desired image. An advantage of this embodiment is that only a single D/A conversion circuit 81 is needed and the distribution circuit 83 only has to handle relatively low level analog signals.

What is claimed is:

1. An image recording apparatus comprising:

a particle modulator formed with a plurality of control electrodes being insulated from each other and a plurality of apertures, each aperture penetrating one of said plurality of control electrodes;

toner supplying means for supplying charged toner particles to said particle modulator;

image signal receiving means for receiving digital electrical signals from a signal source, the digital electrical signals representing a plurality of levels of potential to be applied to said plurality of control electrodes;

converting means for converting the digital electrical signals received by said image signal receiving means to analog signals; and potential applying means for applying potentials to each of said control electrodes in accordance with the analog signals converted by said converting means, whereby potentials corresponding to the levels represented by the digital electrical signals are applied to said control electrodes.

2. An image recording apparatus as in claim 1, wherein the image signal receiving means comprises means for serially receiving the digital electrical image signals from the signal source.

3. An image recording apparatus as in claim 2, wherein the signal source is a digital computer.

4. An image recording device as in claim wherein the image signal receiving means includes distributing means for distributing received image signals to the converting means.

5. An image recording device as in claim 4, wherein the distributing means serially supplies the digital electrical signal to the converting means.

6. An image recording device as in claim 5, wherein the potential applying means includes means responsive to the converting means for supplying potentials to each of the control electrodes based on the analog signals from the converting means.

7. An image recording apparatus as in claim 1, wherein the potential applying means includes means responsive to the converting means for supplying the plurality of levels of potentials based on the analog signals from the converting means and distributing means for distributing the plurality of levels of potentials from the means for supplying the plurality of levels of potentials to the control electrodes.

8. An image recording apparatus as in claim 1, wherein the potential applying means includes a plurality of means, one for each control electrode, for supplying a potential based on the analog signal to an associated control electrode and distributing means for distributing the analog signals from the converting means to the plurality of means for supplying a potential.

9. An image recording apparatus comprising:

a particle modulator including a layer of insulating material having a first side and a second side opposite the first side; a reference electrode formed on the first side of said layer of insulating material; a plurality of control electrodes formed on the second side of said layer of insulating material, each of said plurality of control electrodes being insulated from the others; and wherein an aperture is formed in each control electrode so that the aperture extends through the three layers comprising said reference electrode, said layer of insulating material, and said control electrode;

toner supplying means for supplying charged toner particles adjacent the apertures extending through said reference electrode;

moving means for moving a support member relative to said particle modulator, whereby dots are formed by the adherence of toner particles, which pass through the aperture, onto the support member, and receiving means for receiving digital electrical image signals from a host source having a plurality of levels;

converting means for converting the digital image signals to analog signals; and potential applying means for applying a potential to each of said control electrodes in accordance with said analog signals.

10. An image recording apparatus as in claim 9, wherein the receiving means includes means for serially receiving the digital electrical image signals from the host source.

11. An image recording apparatus as in claim 9, wherein the converting means comprises a plurality of digital to analog converters, one for each control electrode, and wherein the receiving means includes distributing means for distributing the digital electrical image signals to the plurality of digital to analog converters.

12. An image recording apparatus as in claim 11, wherein the potential applying means includes a plurality of potential supplying means, one for each control electrode, for receiving the analog signal from an associated converter and supplying a potential based on the analog signal to an associated control electrode.

13. An image recording apparatus as in claim 9, wherein the potential applying means includes potential supplying means for supplying potentials based on the analog signals from the converting means and distributing means for distributing the potentials from the potential supplying means to the control electrodes.

14. An image recording apparatus as in claim 9, wherein the potential applying means includes a plurality of potential supplying means, one for each control electrode, for supplying a potential based on the analog signal to an associated control electrode and distributing means for distributing the analog signals from the converting means to the plurality of potential supplying means.

15. An image recording apparatus comprising:

a particle modulator for controlling the flow of charged toner particles to an image receiving member, the particle modulator having a plurality of control electrodes electrically insulated from each other and an aperture for the passage of toner particles formed in each of the plurality of control electrodes;

a toner particle supplying means for supplying charged toner particles adjacent the apertures of the control electrodes;

a moving means for moving the image receiving member relative to the particle modulator;

a back electrode for attracting toner particles passing through the particle modulator to the image receiving member;

image signal receiving means for receiving serial digital electrical image signals from a digital signal source, said digital signals representing a plurality of levels of potential to be applied to said plurality of control electrodes;

a plurality of digital to analog conversion circuits, each one of the plurality of conversion circuits being associated with one of the plurality of control electrodes for converting the digital electric image signals to analog signals;

a distribution means for distributing the digital electric image signals received by the receiving means to the plurality of conversion circuits; and a plurality of potential supplying circuits, one of each of the plurality of potential supplying circuits being associated with one of the conversion circuits, for supplying a potential to each of the control electrodes based on an analog signal received from the associated one of the conversion circuits.

16. An image forming apparatus as in claim 15, wherein the particle modulator comprises a longitudinally extending body having a first surface and a second surface opposed to the first surface, a reference electrode disposed on the first surface and wherein the control electrodes are disposed on the second surface.

* * * * *